US012280486B2

(12) United States Patent
Tata et al.

(10) Patent No.: US 12,280,486 B2
(45) Date of Patent: Apr. 22, 2025

(54) BUTTON ASSEMBLY

(71) Applicant: Honeywell Safety Products USA, Inc., Charlotte, NC (US)

(72) Inventors: Raviteja Tata, Hyderabad (IN); Alfred Flojo, Lincolnshire, IL (US); Christy Garippo, Woodridge, IL (US); Prudhvi Yarlagadda, Hyderabad (IN); Ashish Jain, Bangalore (IN); Rizwan Ahmad, Hyderabad (IN); Ravi Avupati, Hyderabad (IN)

(73) Assignee: Honeywell Safety Products USA, Inc., Charlotte, NC (US)

( * ) Notice: Subject to any disclaimer, the term of this patent is extended or adjusted under 35 U.S.C. 154(b) by 645 days.

(21) Appl. No.: 17/318,925

(22) Filed: May 12, 2021

(65) Prior Publication Data

US 2022/0362922 A1    Nov. 17, 2022

(51) Int. Cl.
*F16B 7/10*    (2006.01)
*B25G 1/04*    (2006.01)
*F16B 7/04*    (2006.01)

(52) U.S. Cl.
CPC ............... *B25G 1/04* (2013.01); *F16B 7/042* (2013.01); *F16B 7/105* (2013.01); *Y10T 403/32483* (2015.01); *Y10T 403/7091* (2015.01)

(58) Field of Classification Search
CPC . F16B 7/042; F16B 7/10; F16B 7/105; B25G 1/04; Y10T 403/32459; Y10T 403/32467; Y10T 403/32475; Y10T 403/32482; Y10T 403/32508; Y10T 403/32524; Y10T 403/7075; Y10T 403/7077; Y10T 403/7079; Y10T 403/7091
See application file for complete search history.

(56) References Cited

U.S. PATENT DOCUMENTS

| 2,675,257 | A | * | 4/1954 | Specht | E21B 10/44 |
| | | | | | 403/328 |
| 3,239,255 | A | * | 3/1966 | Murcott | A47B 9/08 |
| | | | | | 403/329 |
| 3,672,710 | A | * | 6/1972 | Kroopp | F16B 7/0466 |
| | | | | | 403/201 |
| 3,864,048 | A | * | 2/1975 | Parker | F16B 7/105 |
| | | | | | 403/328 |
| 3,980,409 | A | * | 9/1976 | Turner | H01H 31/006 |
| | | | | | 403/328 |
| 4,047,821 | A | * | 9/1977 | Hoke | H02G 1/02 |
| | | | | | 403/328 |

(Continued)

*Primary Examiner* — Josh Skroupa
*Assistant Examiner* — Kevin J Baynes
(74) *Attorney, Agent, or Firm* — Alston & Bird LLP (57) ABSTRACT

A button assembly for a telescopic hot stick is provided. The button assembly comprises a button housing, a button, and a fastener. The button housing defines a cavity and at least one groove, and the cavity has a bottom cavity surface. The button is disposed in the cavity and the button has a first end and a second end. The second end is configured to face the bottom cavity surface. The fastener is disposed within the at least one groove, and the fastener is positioned adjacent the second end of the button. The fastener is spaced apart from the second end to collectively define a gap between the second end and the fastener.

11 Claims, 7 Drawing Sheets

(56) References Cited

U.S. PATENT DOCUMENTS

| | | | | |
|---|---|---|---|---|
| 4,079,978 A * | 3/1978 | McMullin | F16B 7/105 | 248/188.5 |
| 4,385,849 A * | 5/1983 | Crain | F16B 7/105 | 343/901 |
| 5,070,620 A * | 12/1991 | Crain | F16B 7/10 | 403/324 |
| 5,255,993 A * | 10/1993 | Kovacs | F16B 7/042 | 403/328 |
| 5,335,949 A * | 8/1994 | Maury | F16B 7/105 | 403/328 |
| 5,593,196 A * | 1/1997 | Baum | B25J 1/04 | 403/328 |
| 5,816,734 A * | 10/1998 | Wåhlin | F16B 7/0466 | 403/231 |
| 6,079,894 A | 6/2000 | Obitts | | |
| 6,338,587 B1 * | 1/2002 | Kuo | F16B 7/105 | 190/115 |
| 6,478,503 B1 * | 11/2002 | Cheng | B62B 9/245 | 280/47.38 |
| 6,854,916 B2 * | 2/2005 | Hsieh | F16B 7/105 | 403/109.1 |
| 6,872,039 B2 * | 3/2005 | Baus | F16B 19/109 | 411/347 |
| 7,628,369 B2 * | 12/2009 | Chen | F16B 7/105 | 248/354.3 |
| 7,967,259 B2 * | 6/2011 | Nakatani | F16B 7/042 | 248/407 |
| 8,469,423 B1 | 6/2013 | Crowley, Jr. et al. | | |
| 8,485,751 B2 * | 7/2013 | Vetesnik | F16B 7/105 | 403/109.1 |
| 8,667,875 B2 * | 3/2014 | Haman | B25B 21/02 | 81/463 |
| 8,926,214 B2 * | 1/2015 | Lah | A45B 9/00 | 135/75 |
| 9,416,806 B2 * | 8/2016 | Vetesnik | F16B 7/105 | |
| 10,077,791 B2 * | 9/2018 | Kresge | F16B 7/042 | |
| 11,686,412 B2 * | 6/2023 | Oggier, III | F16B 7/182 | 403/243 |
| 2007/0031184 A1 * | 2/2007 | Baxstrom | F16B 21/125 | 403/109.3 |
| 2009/0301853 A1 | 12/2009 | Yang et al. | | |
| 2011/0002731 A1 * | 1/2011 | Vetesnik | F16B 7/14 | 403/108 |
| 2011/0101716 A1 * | 5/2011 | Nolte | F16B 7/105 | 294/174 |
| 2013/0236237 A1 * | 9/2013 | Schmidt | F16B 7/042 | 403/109.3 |
| 2013/0243521 A1 * | 9/2013 | Vetesnik | F16B 7/14 | 403/109.3 |
| 2014/0290034 A1 * | 10/2014 | Vetesnik | F16B 7/105 | 29/525.01 |

* cited by examiner

BUTTON ASSEMBLY

TECHNOLOGICAL FIELD

Example embodiments of the present disclosure relate generally to telescopic hot sticks, and more particularly, to a button assembly of a hot stick.

BACKGROUND

Telescopic hot sticks are typically used in a high voltage electrical environment where a long reach is needed to access an electrical conductor (e.g., an electric wire, post, or ball stud) located at a height. The electrical conductor, for instance, can be located on a power pole, transmission lines or the like. A user may perform a wide variety of tasks such as opening and closing various types of switches, lifting earthing devices, installing personal protective grounds and load break tools, cleaning conductors, replacing fuses, and pruning tree limbs using the telescopic hot sticks.

Telescopic hot sticks are constructed of multiple tubes coupled to each other in a telescopic configuration where each tube is slidingly engaged with an adjacent tube. To adjust length of the telescopic hot stick, each tube is either extended out from the adjacent tube to extend the hot stick or inserted within the adjacent tube to retract the hot stick. Each tube has a button to allow sliding in and out of the tube with respect to the adjacent tube. Hot sticks are typically constructed of a suitable dielectric material and include a tool holder at an end to engage a wide array of different tools or the like.

BRIEF SUMMARY

The illustrative embodiments of the present disclosure relate to a button assembly for a telescopic hot stick. The button assembly comprises a button housing, a button, and a fastener. The button housing defines a cavity and at least one groove, and the cavity has a bottom cavity surface. The button is disposed in the cavity and the button has a first end and a second end. The second end is configured to face the bottom cavity surface. The fastener is disposed within the at least one groove, and the fastener is positioned adjacent the second end of the button. The fastener is spaced apart from the second end to collectively define a gap between the second end and the fastener. In operation, when the button is pressed, the button traverses the gap and the second end of the button contacts the fastener, and the fastener stops further movement of the button.

In an example embodiment, the button assembly comprises a spring disposed in the cavity, wherein a first end of the spring is coupled to the second end of the button and a second end of the spring is coupled to the bottom cavity surface of the cavity.

In an example embodiment, the second end of the button defines a spring groove to receive the first end of the spring.

In an example embodiment, the first end of the button is of a trapezoidal shape.

In an example embodiment, a longitudinal axis of the fastener is orthogonal to a longitudinal axis of the button, when the fastener is disposed in the at least one groove.

In an example embodiment, the button housing defines two grooves, wherein each groove receives a fastener and each fastener is positioned adjacent the second end of the button.

In an example embodiment, the button housing is inserted within a tube of the telescopic hot stick.

In an example embodiment, a telescopic hot stick comprises at least one outer tube and an inner tube coupled to each other in a telescopic configuration. The telescopic hot stick comprises a button housing, a button, and two fasteners. The button housing is inserted in the inner tube of the telescopic hot stick, and the button housing defines a cavity and two grooves. The button is disposed in the cavity, and the button has a first end and a second end. Each fastener of the two fasteners is inserted in a groove of the two grooves, adjacent the second end of the button, and each fastener is spaced apart from the second end to collectively define a gap between the second end of the button and the fastener. When the button is pressed, the button traverses the gap and the second end of the button contacts the two fasteners, and the two fasteners stop further movement of the button.

In some embodiments, the telescopic hot stick comprises a spring disposed in the cavity, and a first end of the spring is coupled to the second end of the button and a second end of the spring is coupled to a bottom cavity surface of the cavity. When the button is pressed, the spring compresses.

In an example embodiment, the second end of the button defines a spring groove to receive the first end of the spring.

In some embodiments, each fastener is a rigid stopper comprising one of a screw, a guide pin, a nut, a rivet and a bolt.

In an example embodiment, a length of each fastener of the two fasteners is perpendicular to a length of the button.

In an example embodiment, the first end of the button is of a trapezoidal shape.

In an example embodiment, the inner tube has a hole, and a portion of the button protrudes outwardly from the hole, wherein the outer tube rests on the portion of the button when the telescopic hot stick is in an extended configuration and when the button is pressed, the portion of the button moves inside the inner tube and the outer tube slidably moves over the inner tube.

In an example embodiment, a button assembly comprises a button housing, a button, and a fastener. The button housing defines a cavity and at least one groove, wherein the cavity has a bottom cavity surface, and the button is disposed in the cavity. The button has a first end and a second end separated by a length of the button and the fastener is disposed within the at least one groove, wherein a longitudinal axis of the fastener is orthogonal to the length of the button, wherein the fastener is spaced apart from the second end to collectively define a gap between the second end of the button and the fastener, when the button is pressed, the button traverses the gap and the second end of the button contacts the fastener, and the fastener stops further movement of the button.

In some embodiments, the fastener is a rigid stopper comprising one of a screw, a guide pin, a nut, a rivet and a bolt.

In various embodiments, the button assembly comprises a spring disposed in the cavity, wherein a first end of the spring is coupled to the second end of the button and a second end of the spring is coupled to a bottom cavity surface of the cavity, and when the button is pressed, the spring compresses.

In an example embodiment, the second end of the button defines a spring groove to receive a first end of a spring.

In an example embodiment, the button housing is insertable within an inner tube of a telescopic hot stick.

In an example embodiment, the first end of the button has a trapezoidal shape.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The telescopic hot sticks are insulating sticks designed for environment where long reach is needed with speed and safety to access an electrical conductor. The telescopic hot sticks are made of insulating material and include multiple tubes that are slidably coupled to each other. An outer tube of the multiple tubes slides over an inner tube of the multiple tubes. The inner tube has a button on an outer surface of the inner tube.

For adjusting length of the hot stick, a lineman may press the button for extending or retracting the hot stick. However, pressing the button with the thumb causes the thumb to be caught between the outer tube and the inner tube. This causes the thumb of the user to be pinched between the two tubes. The user, on several occasions, also wear gloves and the gloves get caught between two mutually adjacent telescoped tubes.

Further, shape of the buttons of such telescopic hot sticks are either circular, or rectangular, or square. The circular shaped buttons have a point load on finger and the pressure applied on the button is not distributed uniformly. The buttons having square or rectangular shapes are of bigger size and require bigger holes in stick causing finger/glove to get caught in between adjacent tubes and increase probability of pinching. The telescopic hot sticks also use adhesives to couple components of a button assembly. The components develop a permanent joint over time and cause issues with disassembling and assembling of the button assembly. To this end, existing hot sticks having buttons to extend and retract the tubes have issues related to user handling and pinching.

Various example embodiments described in present disclosure relates to a button assembly of a telescopic hot stick providing ease of handling. The disclosed button assembly prevents the pinching issue and formation of permanent joints. The button assembly is inserted into an inner tube of the telescopic hot stick. The button assembly has a button housing defining a cavity and a slot. The cavity has a bottom cavity surface. A button having a first end and a second end is disposed within the cavity of the housing and a fastener is disposed in the slot of the button housing. The fastener is disposed adjacent the second end of the button and the fastener is aligned such that a length of the button is perpendicular to a length of the button. In an embodiment, the button housing has two sots and each slot is configured to receive a fastener. Each of the two fasteners are aligned in perpendicular to the length of the button.

The fastener is spaced apart from the second end of the button to define a gap between the second end of the button and the fastener. The button assembly has a spring which is disposed in the cavity, where a first end of the spring is coupled to the second end of the button and a second end of the spring is coupled to the bottom cavity surface of the housing. In operation, when the button is pressed the button traverses the gap and the spring compresses. The second end of the button contacts the fastener and the fastener stops further movement of the button.

The details regarding components of the button assembly and their working is described in detail with reference to subsequent figures.

The components illustrated in the figures represent components that may or may not be present in various example embodiments described herein such that embodiments may include fewer or more components than those shown in the figures while not departing from the scope of the disclosure.

Turning now to the drawings, the detailed description set forth below in connection with the appended drawings is intended as a description of various example configurations and is not intended to represent the only configurations in which the concepts described herein may be practiced. The detailed description includes specific details for the purpose of providing a thorough understanding of various concepts with like numerals denoting like components throughout the several views. However, it will be apparent to those skilled in the art of the present disclosure that these concepts may be practiced without these specific details.

Figure 1:
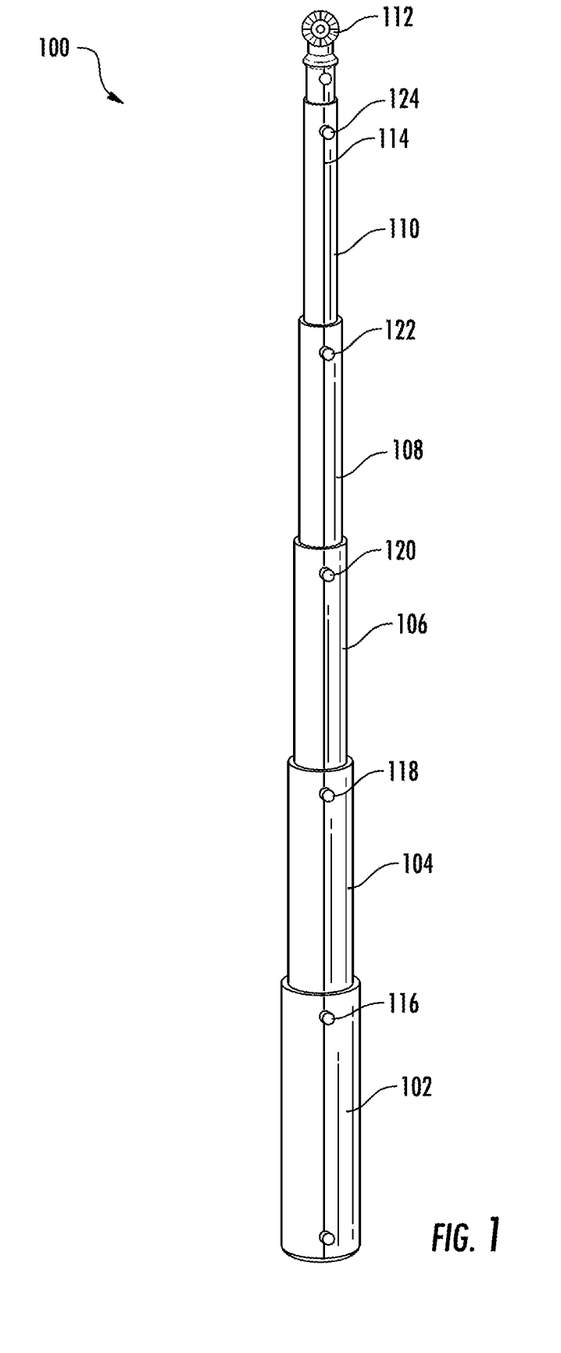
FIG. 1 illustrates a perspective view of a telescopic hot stick, in accordance with an example embodiment of the present disclosure.

FIG. 1 illustrates a perspective view of a telescopic hot stick 100, in accordance with an example embodiment of the present disclosure. The hot stick 100 has multiple sections or tubes 102, 104, 106, 108, and 110. Each tube or a section is coupled to an adjacent tube in a telescopic configuration. For instance, the tube 102 is coupled to the tube 104, and the tube 104 is coupled to the tube 106 and so on. The hot stick 100 has the inner tube 102 closest to a lineman or a user using the hot stick 100 and a distal tube 110 at an opposite end. The distal end 110 connects to a universal tool end 112 or another attachment for engaging a tool used by the lineman. The universal tool end 112 is connected to the hot stick 100 by pinning or by threaded screws fitting into threaded bores in the tool end 112. Accordingly, the hot stick 100 includes pin holes and screw holes for such purposes.

The universal tool end 112 may include teeth for attaching to a tool, and corresponding bores to provide for attachments with the tool. These bores allow for tools to be attached conveniently and allow the lineman to manipulate the tools more efficiently during handling of the hot stick 100. The inner tube 102 of the hot stick 100 includes an end cap that fills the end of that section from the perspective of the lineman. During operation, the lineman may align one of the bores to a visible line 114 on the multiple tubes 102-110, and know the orientation of the tool end 112 when used in dark conditions with low visibility.

Each of the tubes 102-110 includes a button, such as the buttons 116, 118, 120, 122, and 124 on respective tubes. The buttons 116-124 are used to adjust length of the hot stick 100 by extending or retracting the tubes 102-110. Each button of the buttons 116-124 is used to retract a tube into an adjacent tube. For instance, the button 116 on tube 102 is used to retract the tube 104 by sliding the tube 104 on the tube 102, and the button 118 on tube 104 is used to extend the tube 106 from the tube 104 and slide the tube 106 onto the tube 104 and so on. Each of the buttons 116-124 is disposed within a cavity of a button housing, described in detail with respect to subsequent figures.

In an extended position where each tube 116-124 are extended out of respective adjacent tubes, a lock position among adjacent tubes is attained to provide stability and strength to the hot stick 100 for holding the tool end 112 and perform various operations with the hot stick 100.

Figure 2:
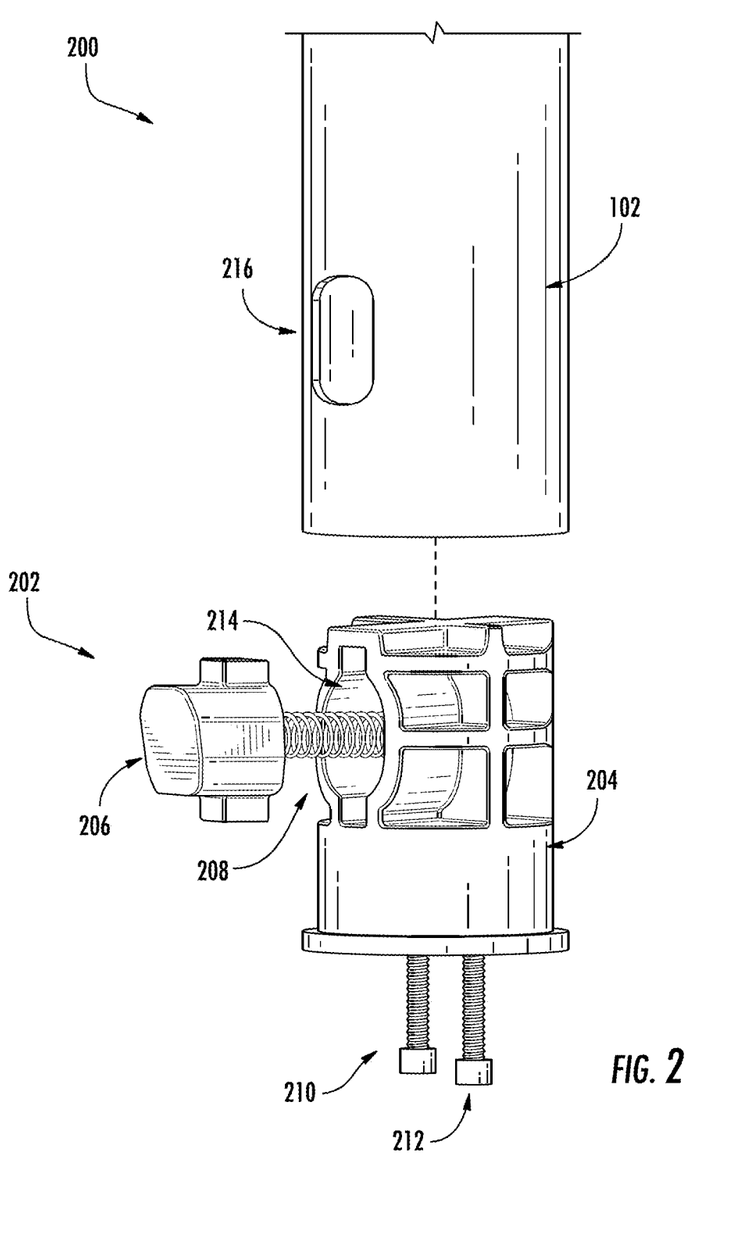
FIG. 2 illustrates an exploded view of a button assembly, in accordance with an example embodiment of the present disclosure.

FIG. 2 illustrates an exploded view 200 of the button assembly 202, in accordance with an example embodiment of the present disclosure. The button assembly 202 comprises a button housing 204, a button 206, a spring 208 and two fasteners 210 and 212. The button housing 204 defines a cavity 214.

The button 206 and the spring 208 are disposed in the cavity 214 of the button housing 204. As shown in FIG. 2, the spring 208 is inserted in the cavity 214 and then the button 206 is inserted within the cavity 214 during assembly. The button 206 is positioned on the spring 208 such that a longitudinal axis of the button 206 is aligned with a longitudinal axis of the spring 208, and a pressure applied on the button 206 during pressing the button is evenly distributed on the spring 208 thereby causing the spring 208 to compress from its initial position. When there is no pressure applied on the button 206, the spring 208 regains the initial position by applying an outward pressure on the button 206 causing the button 206 to be in a released position.

During assembling, the spring 208 is inserted into the button housing 204 and then the button 206 is inserted into the button housing 204. In an example, the button housing 204 has predefined guide ways to allow easy insertion and removal of the button 206 into and from the button housing 204. The button 206 is then pressed into the button housing 204 and the button housing 204 is inserted into a Fiberglass Reinforced Panels (FRP) tube, such as the tube 102 of the hot stick 100. The tube 102 has an inner diameter that is selected based on the diameter of the button housing 204 such that the button housing 204 can be inserted into the tube 102 and the housing 204 can remain fixed in the inserted position. The button housing 204 has the same cylindrical shape as the tube 102. In other examples, the shape and size of the button housing 204 may be selected based on shape and size of the tube 102 of the hot stick 100. The tube 102 has a hole 216 on surface of the tube 102. The fasteners (or screws) 210 and 212 are then inserted into the button housing 204 from a bottom side of the button housing 204 until screw heads of the screws completely touch the surface of the button housing 204. The alignment of components, such as the button 206, the spring 208 and the fasteners 210 ad 212 within the button assembly 202 provides easy assembling and disassembling of the button assembly 202.

In an assembled position when the button assembly 202 is inserted in the tube 102, the button 206 protrudes out through the hole 216 in the released position. In an example, when the button 206 is pressed, the button 206 moves inside the tube 102 and the adjacent tube 104 (not shown in the figure) slides onto the tube 102.

Figure 3A:
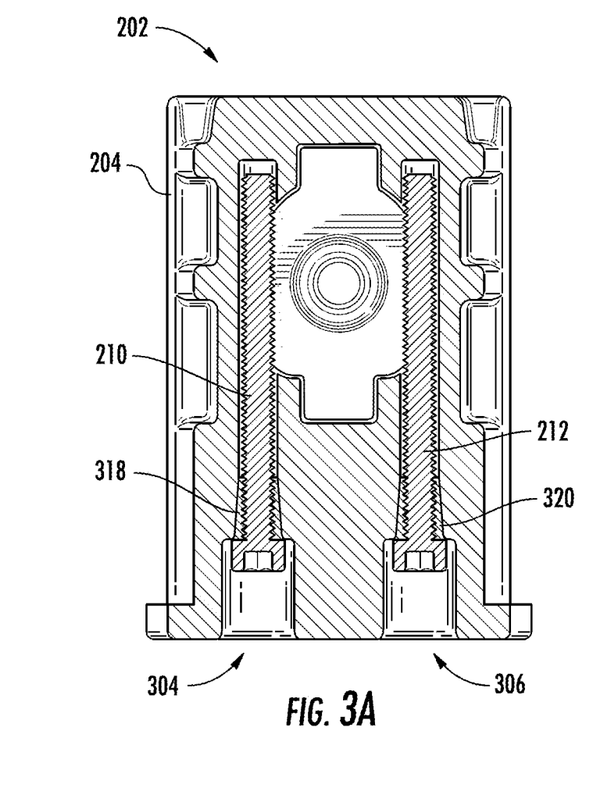
FIGS. 3A-3B illustrate various sectional views of a button assembly, in accordance with an example embodiment of the present disclosure.
Figure 3B:
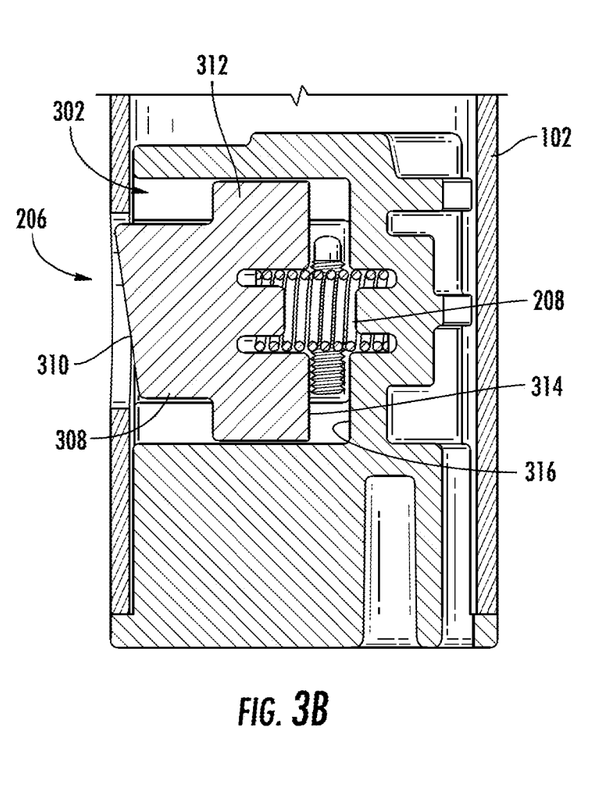

FIGS. 3A-3B illustrate various sectional views of the button assembly 202, in accordance with an example embodiment of the present disclosure. FIG. 3A is a bottom sectional view and FIG. 3B is a side sectional view. As shown in FIGS. 3A-3B, the button assembly 202 comprises the button housing 204, the button 206, and the two fasteners 210 and 212. The button housing 204 defines a cavity 302 and two fastener bores or grooves 304 and 306. The button 206 has a top portion 308 defining a first end 310 and a bottom portion 312 defining a second end 314. A length of the button 206 is defined in between the first end 310 and the second end 314 of the button 206. The cavity 302 has a bottom cavity surface 316 at the end of the cavity 302. The button assembly 202 comprises the fasteners 210 and 212 positioned adjacent the second end 314 of the bottom portion 312 of the button 206. In an example, the fasteners 210 and 212 are rigid stoppers such as screws, guide pins, nuts, rivets and bolts which do not deform when the button 206 is pressed. In an example, the fasteners 210 and 212 are made of metal and do not compress when the button 206 is pressed hard against the fasteners 210 and 212. The button assembly 202 comprises the spring 208 having a first end and a second end.

As shown in FIG. 3B, the button 206, and the spring 208 are disposed in the cavity 302 of the button assembly 202. The button 206 is positioned such that the bottom portion 312 having the second end 314 faces the bottom cavity surface 316 of the cavity 302. The fasteners 210 and 212 are positioned to define a gap between the second end 314 of the button 206 and each of the fasteners 210 and 212. In an example, each of the fasteners 210 and 212 is disposed such that a longitudinal axis of the fastener is orthogonal to a longitudinal axis or the length of the button 206. Although, the figure illustrates the alignment of the fasteners 210 and 212 orthogonal to the button 206, there may be different alignments in which the fasteners 210 and 212 can be positioned with respect to the button 206, as described with reference to FIGS. 5A-5B and FIG. 6.

The first end of the spring is coupled to the second end 314 of the button 206 and the second end of the spring 208 is coupled to the bottom cavity surface 316 of the cavity 302. In an example, the second end 314 of the button 206 defines a spring groove to receive the first end of the spring 208 positioned such that the first end of the spring 208 is inserted within the spring groove. Once inserted within the spring groove, the first end of the spring 208 is fixed into the spring groove. In an example, the first end is removable from the spring groove. In an example, the spring groove has a circular shape to align with the shape of the first end of the spring 208, and the spring groove may have different shapes and sizes based on the first end of the spring 208.

The bottom cavity surface 316 defines a groove to receive the second end of the spring 208. The second end of the spring 208 is inserted into the groove and the groove is shaped to align with the shape of the second end of the spring 208. In an example, the second end of the spring 208 is coupled to the bottom cavity surface 316 through a screw or a bolt. In an example, the grooves 304 and 306 have threaded portions 318 and 320 respectively and the fasteners 210 and 212 are threaded into the grooves 304 and 306. The threaded portions 230 and 232 provide improved coupling of the fasteners 210 and 212 into the grooves 304 and 306 and also easy insertion and removal of the fasteners 210 and 212. Further, there is no glue used within the button housing 204 and there are no permanent joints between the button 206 and the inner tube 102 thereby providing ease of maintenance and replacement of parts.

Figure 4A:
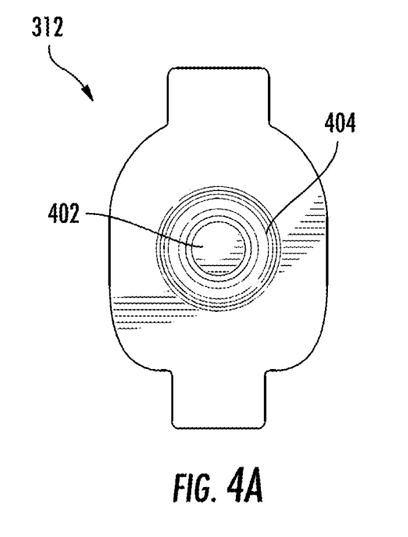
FIGS. 4A-4D illustrate various views of a button of a button assembly, in accordance with an example embodiment of the present disclosure.
Figure 4B:
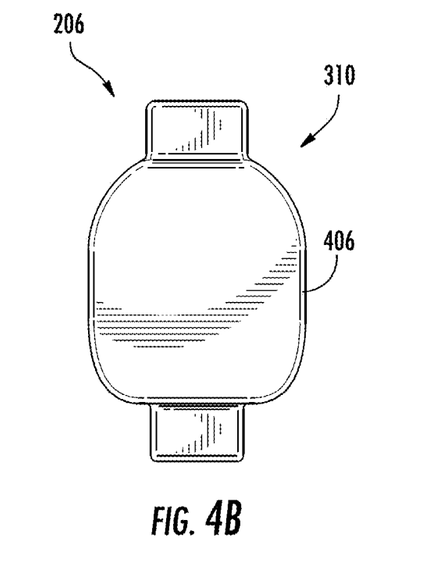
Figure 4C:
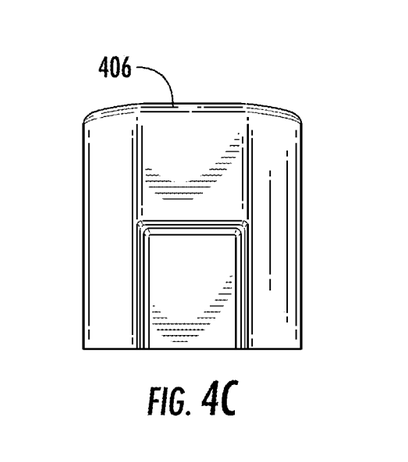
Figure 4D:
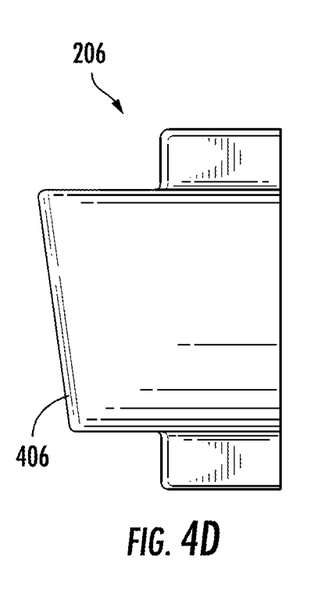

FIGS. 4A-4D illustrates various views of the button 206, in accordance with an example embodiment of the present disclosure. FIG. 4A illustrates a bottom view of the button 206, FIG. 4B illustrates a top view of the button 206 and FIG. 4C and 4D illustrate side views of the button 206. As shown in the FIG. 4A, a bottom portion or the second end 310 of the button 206 comprises a portion 402, and a spring groove 404. The portion 402 is circular in shape and is configured to move in between the fasteners, such as the fasteners 210 and 212, when the button 206 is pressed. In one embodiment, the portion 402 is configured to contact one fastener (not shown in the figure) when the button 206 is pressed. In a released state when the button 206 is not pressed, there is a gap between the portion 402 and the fastener. The spring groove 404 is designed to receive a first end of the spring 208. The first end of the spring 208 is pushed and inserted in the spring groove 404 during assembling.

The first end 310 of the button 206 as shown in FIG. 4B comprises a top face 406 of the button 206. The top face 406 of the button 206 has a trapezoidal shape, as shown. The trapezoidal shape provides optimum ergonomic contact between a thumb of a user and the top face 406 of the button 206. Additionally, such a shape provides uniform force distribution when the button 206 is pressed. In an example, the button 206 may have a different shape such as hexagonal, octagonal or oval, and the like to provide uniform force distribution and ergonomic contact between the thumb and the button 206. In an example, a length l of the button 206, as shown in FIGS. 4C and 4D is 0.627 inches (in). In an assembled state, the gap between the second end 312 and each of the fasteners 210 and 212 is 0.065 in. In an example, a diameter of the inner tube 102 in which the button assembly 202 is disposed is 1.560 in and a diameter of the outer tube 104 is 1.714 in.

Figure 5A:
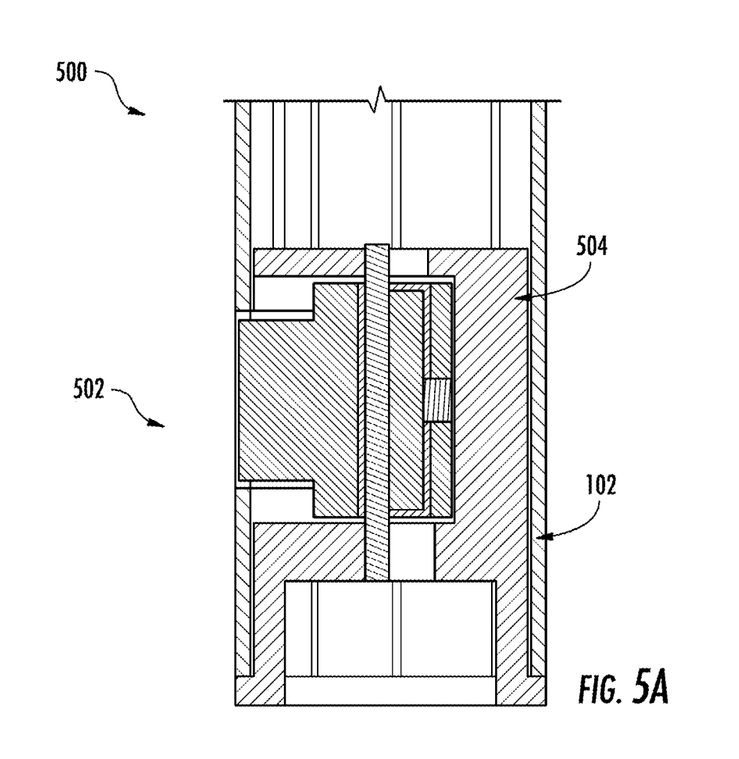
FIGS. 5A-5B illustrate an alternative embodiment of a button assembly for a telescopic hot stick, in accordance with an example embodiment of the present disclosure.
Figure 5B:
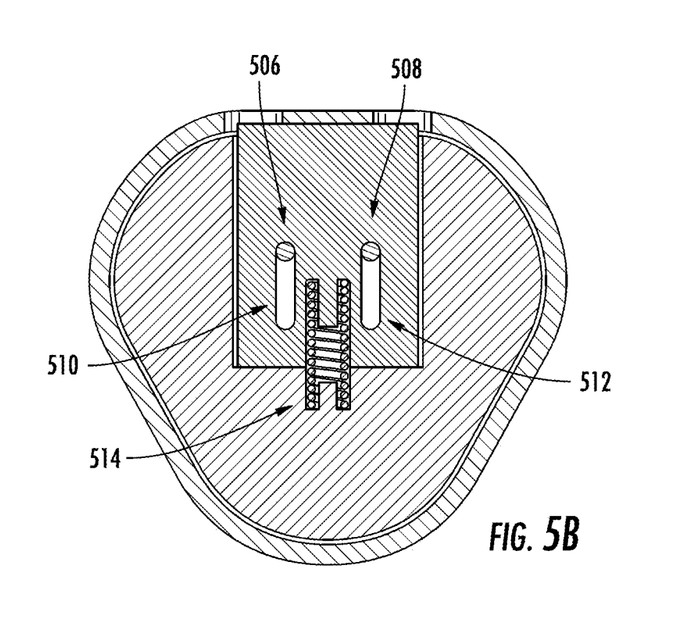

FIGS. 5A and 5B illustrates various sectional views of an alternative button assembly 500, in accordance with an example embodiment of the present disclosure. The alternative button assembly 500 is disposed within the inner tube 102 and comprises a button 502, and a button housing 504. Further, the alternative button assembly 500 comprises guide pins 506 and 508 that are fixed in the button housing 504. The button 502 has two slots 510 and 512 of predefined lengths. The button assembly 500 comprises a spring 514 placed within the button housing 504. The button 502 and the guide pins 506 and 508 are aligned such that the guide pin 506 is positioned within the slot 510 and the guide pin 508 is disposed within the slot 512. In a released state, when the button 502 is not pressed, the guide pins 506 and 508 are positioned along one end, for instance the bottom ends of the respective slots 510 and 512.

In an example, when the button 502 is pressed, the button 502 moves downwards and the guide pins 506 and 508 contact the other ends or the top ends of the slots 510 and 512, as shown in FIG. 5B. In the example, further downward movement of the button 502 is stopped by the top ends of the slots 510 and 512.

Figure 6:
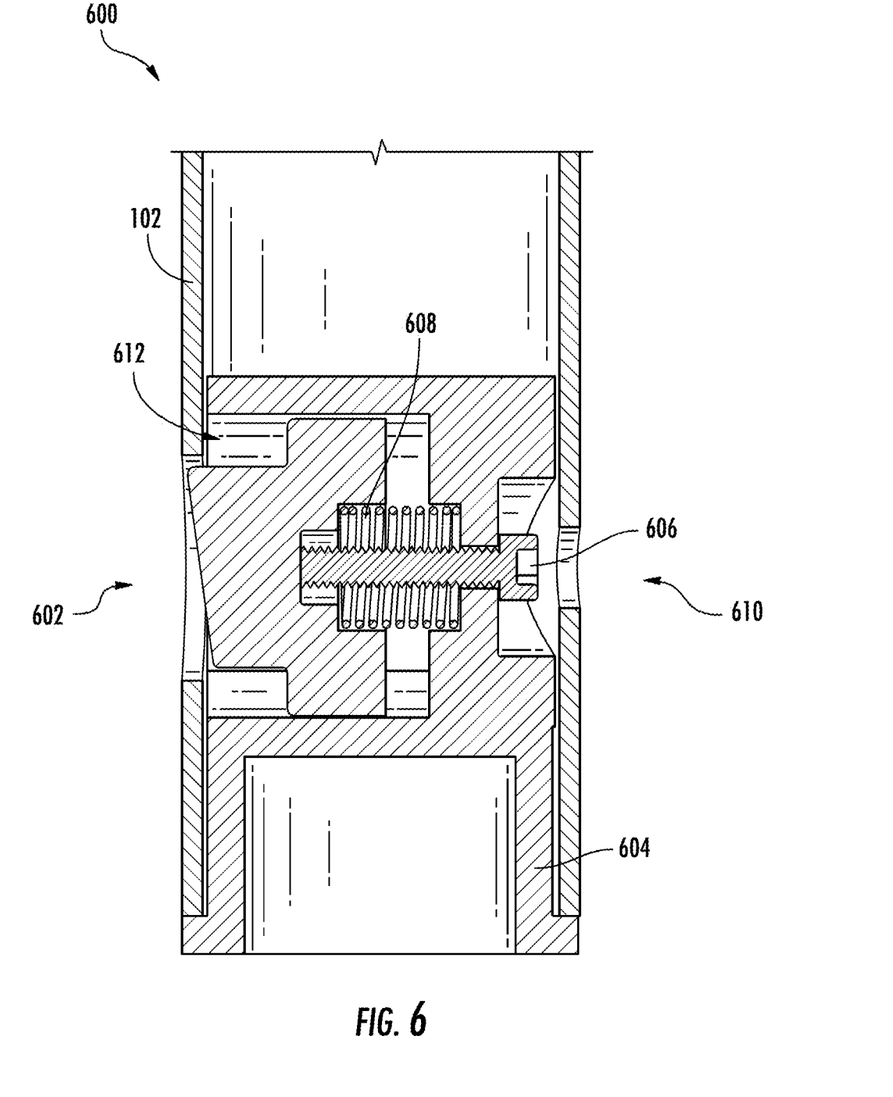
FIG. 6 illustrates another embodiment of a button assembly for a telescopic hot stick, in accordance with an example embodiment of the present disclosure.

FIG. 6 illustrates a sectional view of another alternative button assembly 600, in accordance with an example embodiment of the present disclosure. As shown, the button assembly 600 is inserted into the inner tube 102. The button assembly 600 comprises a button 602 disposed within a button housing 604, a fastener 606, and a spring 608. The inner tube 102 and the button housing 604 has a through hole 610 and the button housing 604 has a cavity 612. During assembling, the button 602 and the spring 608 are inserted into the cavity 612 of the button housing 604, the button housing 604 is then inserted within the inner tube 102 from the rear side of the button housing 604. In the assembled state, the button 602 and the fastener 606 define a gap and when the button 602 is pressed, the button 602 moves downwards and contacts the fastener 606. The fastener 606 stops further movement of the button 602.

Figure 7:
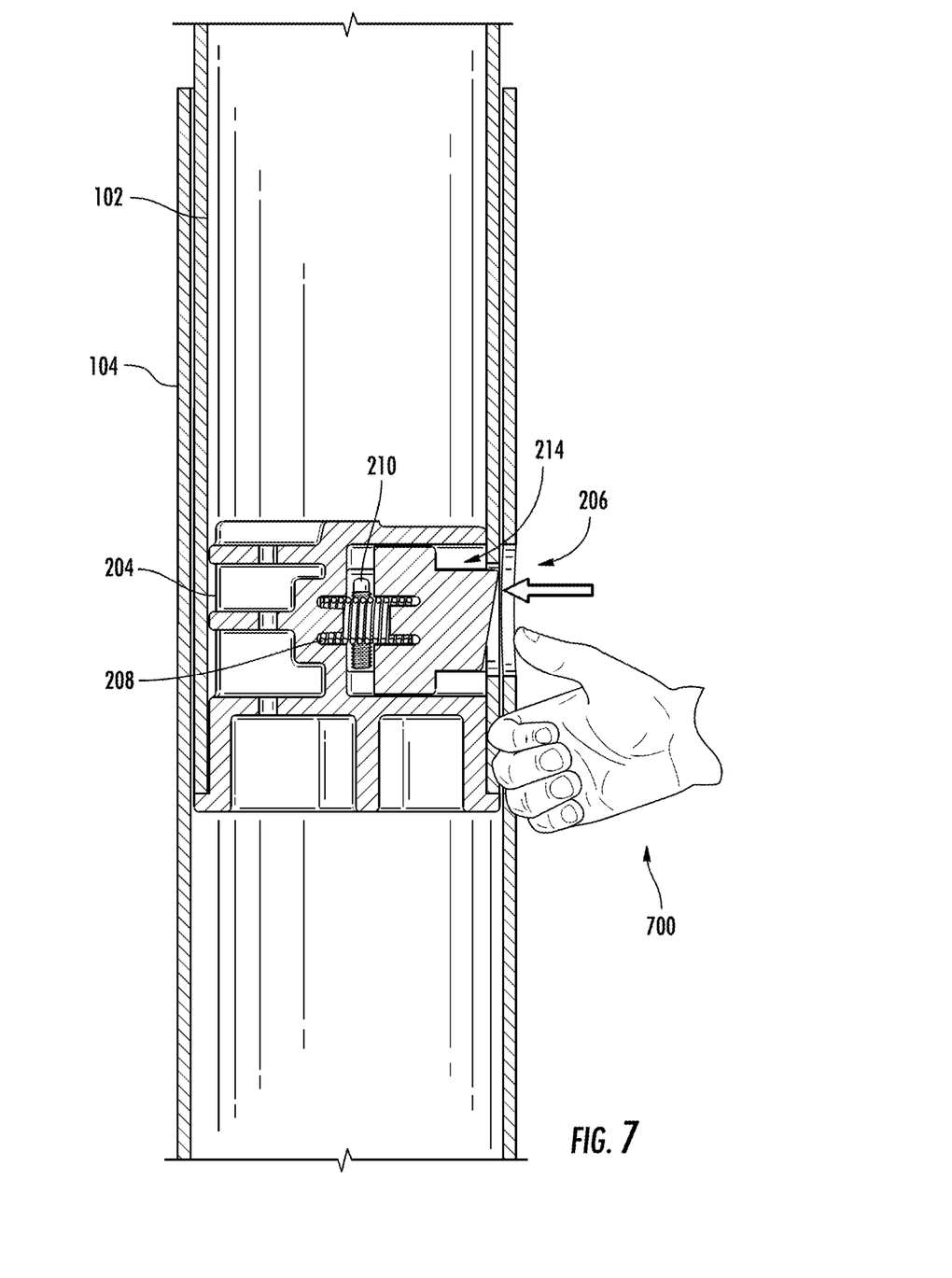
FIG. 7 illustrates an operation of a button assembly for a telescopic hot stick, in accordance with an example embodiment of the present disclosure.

In operation, as shown in FIG. 7, the user 700 presses the button 206 in a given direction as shown in the figure. When the button 206 is pressed, the button 206 moves towards the fastener 210 and the spring 208 compresses. Although the FIG. 7 illustrates the fastener 210, the button housing 204 also comprises the other fastener 212 (not shown in the figure) and when the button 206 is pressed, the button 206 moves towards both fasteners 210 and 212. The button 206 then contacts the fasteners 210 and 212 and is restricted from moving further in the direction. The button 206 is restricted to move further in the direction, such that the button 206 does not move further inside the cavity 214 and the thumb of the user 700 or the gloves is prevented to come in between the outer tube 104 and the inner tube 102. In an example, when the button 206 is pressed the outer tube 104 slides over the inner tube 102 thereby retracting the hot stick 100.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments, but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present disclosure are disclosed herein; however, it is to be understood that the disclosed embodiments are merely exemplary, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While it is apparent that the illustrative embodiments herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A button assembly for a telescopic hot stick, the button assembly comprising:
   a button housing defining a cavity and a first groove, wherein the cavity has a bottom cavity surface;
   a button disposed in the cavity, the button having a first end and a second end, wherein the second end is configured to face the bottom cavity surface; and
   a first fastener disposed within the first groove, wherein the first fastener is positioned along a width of the button and adjacent the second end of the button, and wherein the first fastener is spaced apart from the second end to collectively define a gap between the second end and the first fastener,
   wherein, when the button is pressed, the button traverses the gap and the second end of the button contacts the first fastener, and the first fastener stops further movement of the button,
   wherein the button housing further comprises a second groove, wherein the second groove receives a second fastener, wherein the second fastener is positioned adjacent the second end of the button,
   wherein a distance between the second end of the button and the first fastener is the same as a distance between the second end of the button and the second fastener,
   wherein a spring is disposed in the cavity, wherein a first end of the spring is coupled to the second end of the button and a second end of the spring is coupled to the bottom cavity surface of the cavity, and
   wherein the spring extends transversely between the first fastener and the second fastener.

2. The button assembly of claim 1, wherein the second end of the button defines a spring groove to receive the first end of the spring.

3. The button assembly of claim 1, wherein the first end of the button is of a trapezoidal shape when viewed in a cross section.

4. The button assembly of claim 1, wherein a longitudinal axis of the first fastener is orthogonal to a longitudinal axis of the button, when the first fastener is disposed in the first groove.

5. The button assembly of claim 1 wherein the button housing is insertable within a tube of the telescopic hot stick.

6. The button assembly of claim 1, wherein the button is positioned on the spring such that a longitudinal axis of the button is aligned with a longitudinal axis of the spring.

7. The button assembly of claim 1, wherein the first fastener is a rigid stopper comprising one of a screw, a guide pin, a nut, a rivet or a bolt.

8. The button assembly of claim 1, wherein a length of the button is 0.627 inches.

9. The button assembly of claim 1, wherein the gap between the second end of the button and each fastener is 0.065 inches.

10. The button assembly of claim 1, wherein the first fastener is configured to resist deformation when the button is pressed.

11. The button assembly of claim 1, wherein the first fastener and the second fastener extend between the second end of the button and the bottom cavity surface.

\* \* \* \* \*